Feb. 16, 1971     J. H. TAYLOR     3,564,578

ROTARY ENGINE

Filed Dec. 31, 1969     3 Sheets-Sheet 1

INVENTOR.
JOHN H. TAYLOR
BY
Carl R. Brown
ATTORNEY

Feb. 16, 1971   J. H. TAYLOR   3,564,578
ROTARY ENGINE

Filed Dec. 31. 1969   3 Sheets-Sheet 2

INVENTOR.
JOHN H. TAYLOR
BY
Carl R. Brown
ATTORNEY

INVENTOR.
JOHN H. TAYLOR
BY
Carl R. Brown
ATTORNEY 3,564,578
ROTARY ENGINE
John H. Taylor, 2033 Wilbur St.,
San Diego, Calif. 92109
Continuation-in-part of application Ser. No. 820,174,
Apr. 29, 1969. This application Dec. 31, 1969, Ser.
No. 889,543
Int. Cl. F02b 53/06
U.S. Cl. 123—8.49          8 Claims

ABSTRACT OF THE DISCLOSURE

A rotary engine having a pair of inter-engaging rotors, each with a cam guided slide element which rides in an annular cylinder chamber. Ignition timing means is combined with variable valve actuating mechanism and the engine is adaptable to gaseous fuels with oxidizer, or conventional liquid fuel and air mixtures, admitted under pressure, combustion being very complete with minimum noxious exhaust emission. Basic elements of the engine are designed to allow axial stacking of multiple units on common rotor shafts.

BACKGROUND OF THE INVENTION

This is a continuation-in-part of my co-pending patent application, Ser. No. 820,174 filed Apr. 29, 1969.

Rotary type engines with single or multiple rotors, usually have some type of fixed or movable vanes which separate portions of the rotor chambers for the various stages of a working cycle, such as induction, compression, ignition and exhaust. Several actions are usually occurring in a single chamber simultaneously and sealing becomes a major problem. Timing is also critical and the mechanisms often become complex.

SUMMARY OF THE INVENTION

The engine described herein comprises a unit having a pair of interengaging rotors, each having a single slidable element controlled by a cam to ride in sealed engagement around an annular cylinder chamber, and to retract and extend in timed sequence at exhaust and intake positions. A combustible mixture is admitted under pressure and ignited by timing means integral with the intake valve mechanism, to ensure proper timing, regardless of the position of variable valve control mechanism. The power stroke is continuous through a major portion of a rotation of the rotors and is the only pressure involved action occurring in the chamber, so that sealing is simplified. Due to the prolonged power stroke, combustion is very complete and noxious exhaust products are minimized when using conventional liquid and air mixtures. When using gaseous fuel, such as oxygen and hydrogen, the exhaust product is water vapor which does not cause atmospheric pollution. With oxygen an hydrogen as fuel, the engine can operate underwater, since the exhaust merely condenses into water and there is no undesirable back pressure. In the prolonged combustion action, the heated expanding gasses provide continuous power for almost a complete revolution of the rotors, the smooth rotary motion minimizing vibration and wear on the structure. The basic elements of the engine are designed so that multiple units can be axially stacked with the rotors on common shafts, to assemble an engine of any required size and power.

An object of this invention, therefore, is to provide an engine having a simple arrangement of dual rotors, each with a single cam controlled sliding element comprising the driving and port control means, the associated inlet and ignition timing means being positively synchronized, and the inlet valve opening mechanism being adjustable without affecting ignition timing.

Another object of this invention is to provide an engine having a prolonged power cycle, with very complete combustion which minimizes exhaust pollutants, the engine being adaptable to liquid or gaseous fuels.

Other objects and many advantages of this invention will become more apparent upon a reading of the following detailed description and an examination of the drawings, wherein like reference numerals designate like parts throughout and in which:

DESCRIPTION OF THE PREFERRED EMBODIMENT

Figure 1:
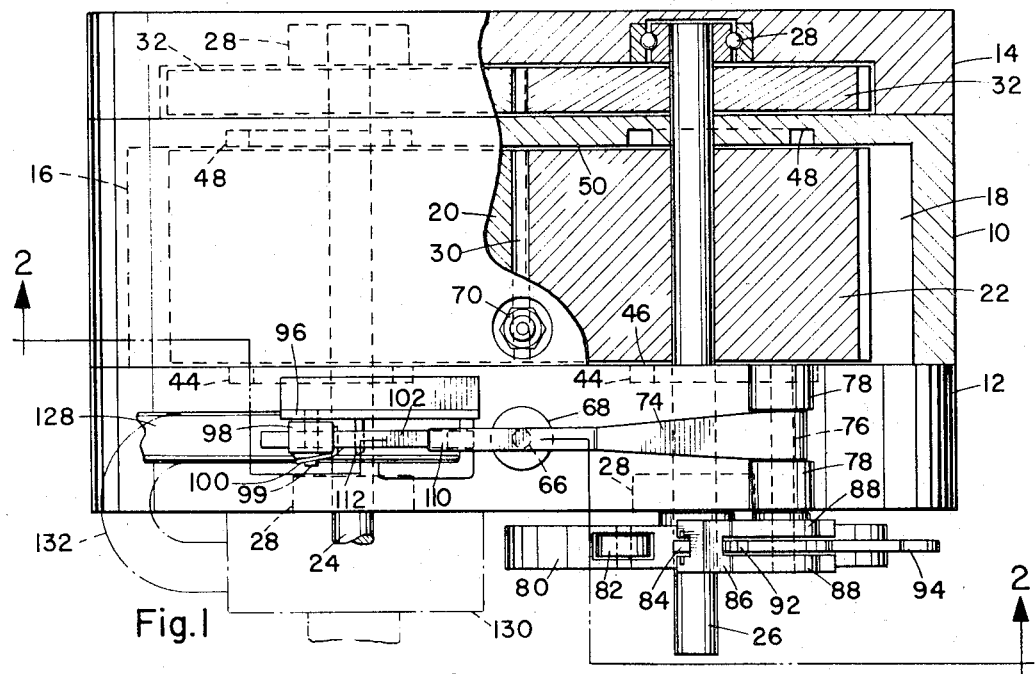
FIG. 1 is a top plan view of a single unit engine, partially cut away.

A single unit of the engine is shown in detail and comprises a cylinder casing 10, a valve body 12 and a gear case 14. Cylinder casing 10 contains a pair of circumferentially intersecting cylindrical chambers 16 and 18, open to one end of the casing, which is generally oval in cross section. Valve body 12 is of similar cross section and is secured over the open end of the cylinder casing, the gear case 14 being secured on the closed end of the cylinder casing. Any suitable means may be used to hold the sections together, such as bolts, not shown, extending axially through the peripheral portions of the sections.

In chambers 16 and 18 are cylindrical rotors 20 and 22, respectively, the rotors being smaller in diameter than the chambers. Rotor 20 is fixed on a shaft 24 and rotor 22 is fixed on a shaft 26, the shafts being parallel and journalled in bearings 28 in the gear case 14 and valve body 12. The rotors have peripheral teeth 30 which interfit at the center between chambers 16 and 18. However, the teeth 30 are merely to form a seal between the rotors, the two rotors being coupled by synchronizing gears 32 fixed to the shafts within gear case 14. This reduces loads and wear on the rotors and makes it unnecessary to use special hardening procedures on the rotors.

Each of the rotors has a radial slot 34 extending the full length of the rotor and opening outwardly. In the slot of rotor 20 is a slide member 36 and in the slot of rotor 22 is a similar slide member 38. The outer trailing edge portion of each slide member, relative to the direction of rotation, has an inwardly curved portion 40. Fixed in each of the slide members 36 and 38 is a guide pin 42, parallel to the axes of the rotor shafts. The ends of guide pins 42 project from the slide members and ride in grooved cam tracks, one cam track 44 being in the face 46 of valve body 12 confronting cylinder casing 10, and the other cam track 48 being in the inner face 50 of the closed end of the cylinder casing. Rollers, or similar means can be fitted on the guide pin ends to reduce friction and wear if necessary. The cam tracks are shaped to hold the slide members in sliding contact with the outer walls of the rotor chambers for the major portion of each rotation, and to retract the slide members in a particular manner as they meet at the center.

Since sealing is not a critical problem in this engine, various conventional types of seals are suitable and no specific arrangement has been shown. In addition to the usual shaft seals, there would be seals between the end faces of the rotors and the confronting faces of the respective chambers and, if necessary, seals in the outer ends of the slide members.

In the upper portion of valve body 12 is an inlet 52, leading to an inlet port 54 in face 46 at the intersection of chambers 16 and 18. In the lower portion of face 46, at the intersection of the chambers is an outlet port 56 leading to an exhaust outlet 58, shown as opening downwardly. Mounted in the top portion of valve body 12 is an inlet valve 60, closing against a seat 62 in inlet 52, the valve being held closed by a lifter spring 64 fitted around the upwardly extending valve stem 66 and under a collar 68 fixed to the stem. Ignition is made by means of a spark plug 70, or similar means, adjacent inlet port 54. The spark plug is shown as being installed in cylinder casing 10, but could be in the valve body 12 by suitable positioning of the inlet valve. An exhaust valve is not essential and, if installed, can be a simple flap valve 72 mounted on the outside of outlet 58 and spring loaded to closed position in any suitable manner.

Figure 2:
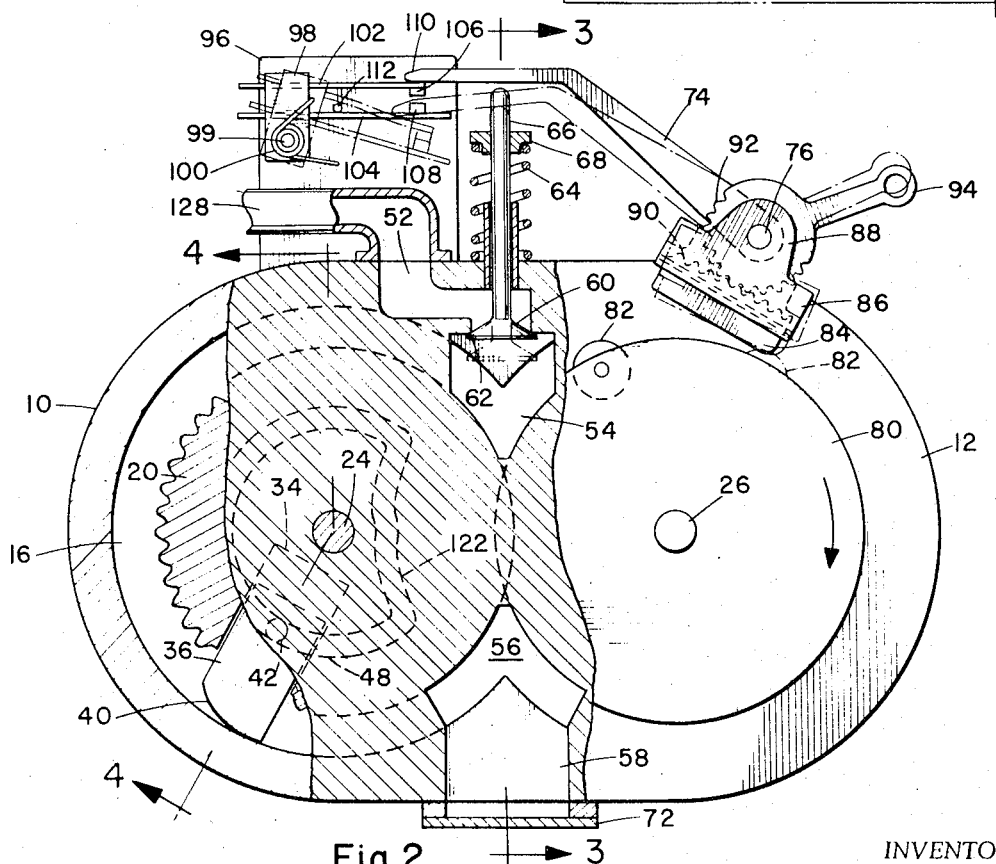
FIG. 2 is a sectional view taken on stepped line 2—2 of FIG. 1.

The inlet valve 60 is actuated by a rocker arm 74 bearing on top of valve stem 66, the rocker arm being pivoted on a rocker shaft 76 journaled in bearings 78 on top of the valve body 12 at one side of the valve. Fixed on the end of shaft 26 extending from valve body 12 is a cam disc 80, in the periphery of which is a cam roller 82. At each revolution the cam roller engages a cam bar 84 slidably mounted in a channel member 86, which is fixed to rocker shaft 76 by lugs 88. On top of cam bar 84 is a toothed rack 90 which is engaged by a pinion 92 rotatably mounted on rocker shaft 76, the pinion having an extended arm 94. By moving the arm 94, the cam bar 84 is slidably adjusted in substantially tangential relation into or out of the path of cam roller 82, so varying the contact time and degree of displacement by the cam action. Arm 94 is coupled to a suitable throttle control by means, such as a push-pull cable, which will accommodate the rocking action of the rocker arm structure. In FIG. 2 the valve closed position is shown in full line and the valve full open position, for the particular throttle setting, is shown in broken line.

To ensure proper ignition timing with a simple mechanism, the spark plug firing is controlled by the action of the rocker arm 74. Secured on top of valve body 12, on the opposite side of the valve from the rocker arm assembly is an upright mounting plate 96. An insulated block 98 is pivotally mounted on plate 96 on a hinge pin 99 and is biased by a return spring 100. Secured in the block 98 are two vertically spaced resilient contact arms 102 and 104, terminating in opposed contacts 106 and 108, respectively, below the extended end 110 of rocker arm 74. The contacts 106 and 108 are held apart by the resilience of their respective arms, and a stop pin 112 fixed in plate 96 limits the upward travel of the lower arm 104, to ensure contact separation. Conventional ignition circuitry, not shown, is connected between contact arms 102 and 104 and spark plug 70. When rocker arm 74 descends to open the valve 60, contacts 106 and 108 are forced together and the contact arms pushed down against return spring 100, as in the broken line position in FIG. 2. The contacts are thus held closed while the inlet valve is open. As the rocker arm rises and the inlet valve closes, the contact arm 104 is held by stop pin 112 and the contacts open, causing the ignition circuitry to fire the spark plug 70 in the normal manner. Thus the spark always occurs when the inlet valve is closed, regardless of the opening time of the valve.

Figure 6B:
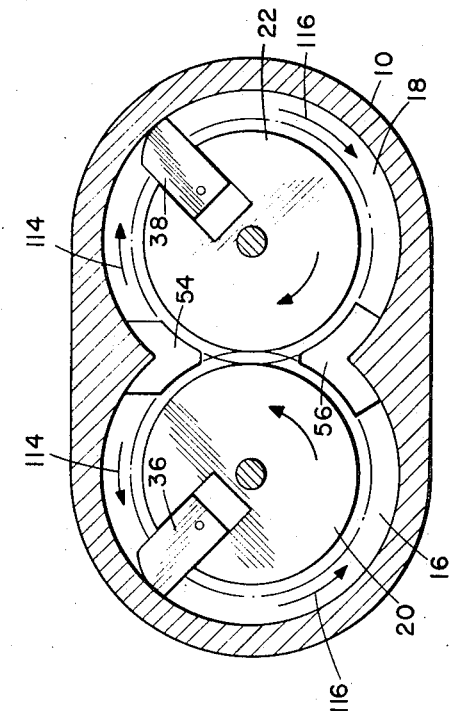
FIGS. 6a through 6d are diagrammatic sectional views showing four positions of the rotors during one cycle of operation.
Figure 6D:
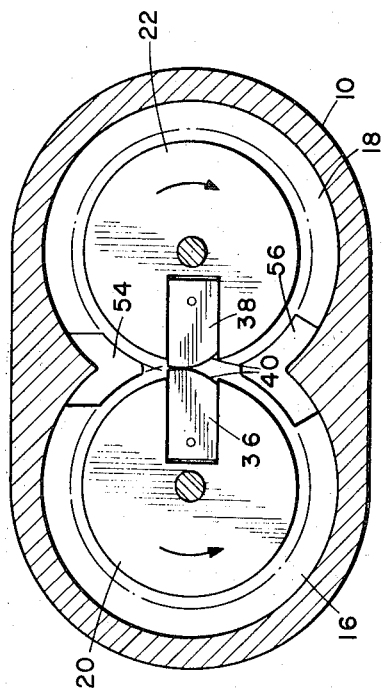
Figure 6A:
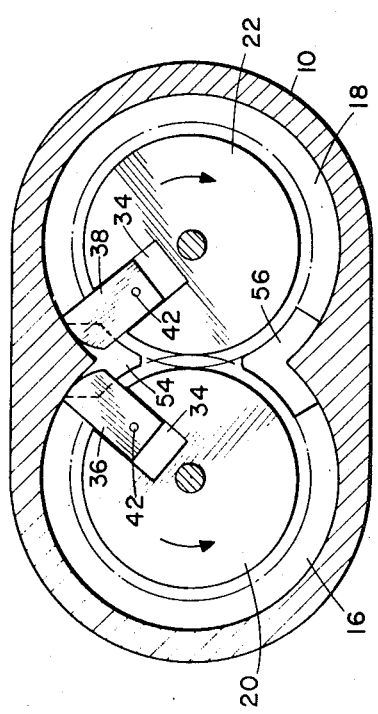

Referring now to FIGS. 6a to 6d, rotation is indicated by directional arrows on the rotors and the teeth of the rotors are indicated by broken outline for simplicity, the teeth maintaining a seal at the intersection of the rotors. In FIG. 6a the slide members 36 and 38 are moving apart and exposing the inlet port 54, as a combustible mixture is admitted. In FIG. 6b, ignition has taken place and the expanding gases from the explosion are driving the slide members apart, as indicated by directional arrows 114. At the same time the contents of chambers 16 and 18 ahead of the slide members is scavenged, as indicated by directional arrows 116, and exhausted through outlet port 56. Due to the large diameter of the rotors, as shown, the power is directed against the slide members at a substantial lever arm from the shaft axis, resulting in a high power output.

Figure 6C:
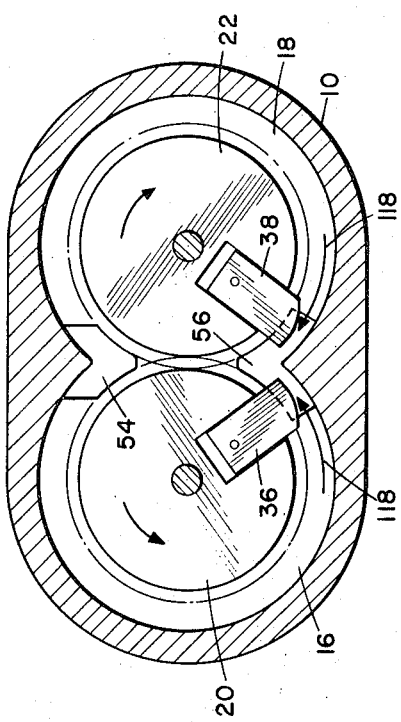

FIG. 6c shows the exhaust portion of the cycle, with slide members 36 and 38 beginning retraction to expose the outlet port 56 and allow the combustion products to escape, as shown, by arrows 118. In FIG. 6d, the slide members 36 and 38 are fully retracted to pass through the intersection of the rotors and then extend for the next cycle.

Figure 5:
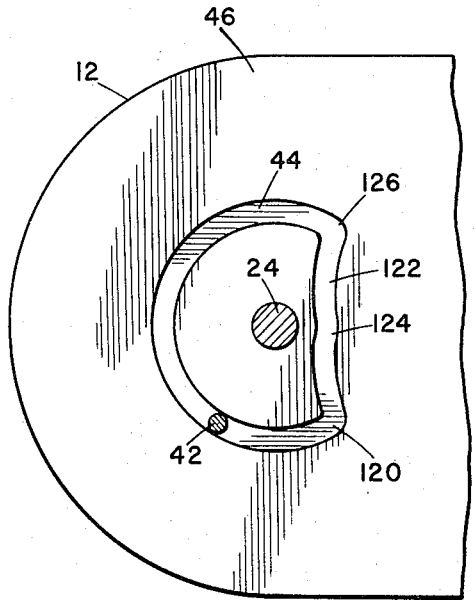
FIG. 5 is a sectional view taken on line 5—5 of FIG. 4.

The motion of the slide members is controlled by the configuration of the cam track, as typified by track 44 in FIG. 5, all the cam tracks being alike. The major portion of the cam track is circular, holding the slide member in sealed contact with the peripheral wall of its chamber. As the slide member, guided by guide pin 42, approaches the exhaust position, a rounded corner 120 in the cam track causes the slide member to begin retraction and expose the exhaust outlet quickly. Retraction and subsequent extension of the slide member is guided by a concave track portion 122, with a slightly convex lobe 124 at the center to maintain sealed contact through the intersection. The curved portions 40 of the slide members maintain sealed contact until extension occurs at a corner 126 leading into the circular portion of the cam track. Exact configuration of the non-circular portions of the cam track will depend on the particular timing required at the intake and exhaust positions.

Since each power cycle occurs over the major portion of a revolution of the rotors, the combustion is prolonged and complete, the exhaust containing a minimum of unburned pollutants. It is this single stage action which simplifies sealing, as compared to some rotary engines in which several stages of greatly differing pressures are occurring around a single chamber. The smooth rotary action, with power applied substantially constantly for the major portion of each revolution, minimizes vibration and greatly reduces wear on the moving and contacting parts.

The engine is adaptable to a variety of fuels, such as oxygen or air and a combustible gas, hydrogen, butane and like gases being examples. When oxygen and hydrogen are used for fuel, the engine is particularly suitable for marine use, with the exhaust being expelled directly into the water. Since the exhaust product is steam or water vapor, the exhaust will condense rapidly with little if any formation of bubbles, the pressure drop due to condensate preventing any undesirable back pressure at the exhaust outlet. With gaseous fuel a simple intake manifold 128 connected to inlet 52 can be used, the gaseous mixture being admitted under controlled pressure by an suitable means. Since the engine does not have a compression stroke, pressurization of the fuel mixture is necessary. For liquid fuels, such as gasoline or kerosene, with air for combustion, a compressor 130 can be coupled to shaft 24, as indicated in broken line in FIG. 1, with a manifold 132 leading to the inlet.

Figure 3:
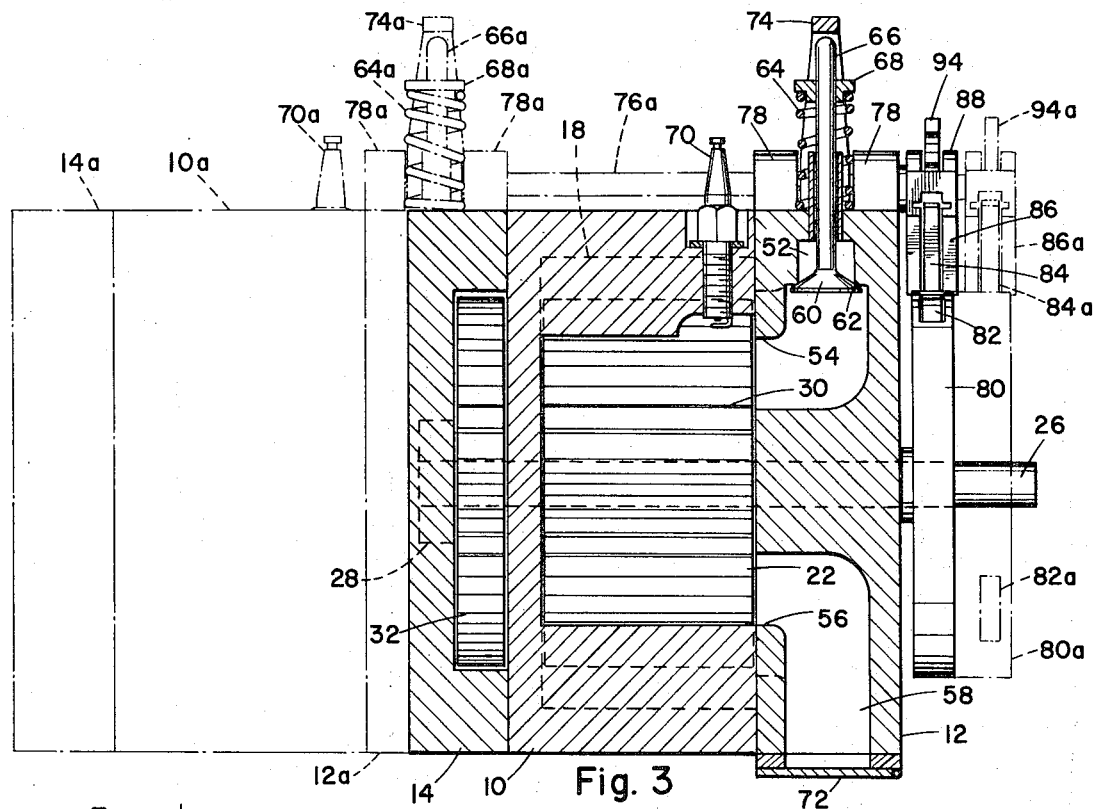
FIG. 3 is a sectional view taken on line 3—3 of FIG. 2, with an additional stacked unit shown in broken line.
Figure 4:
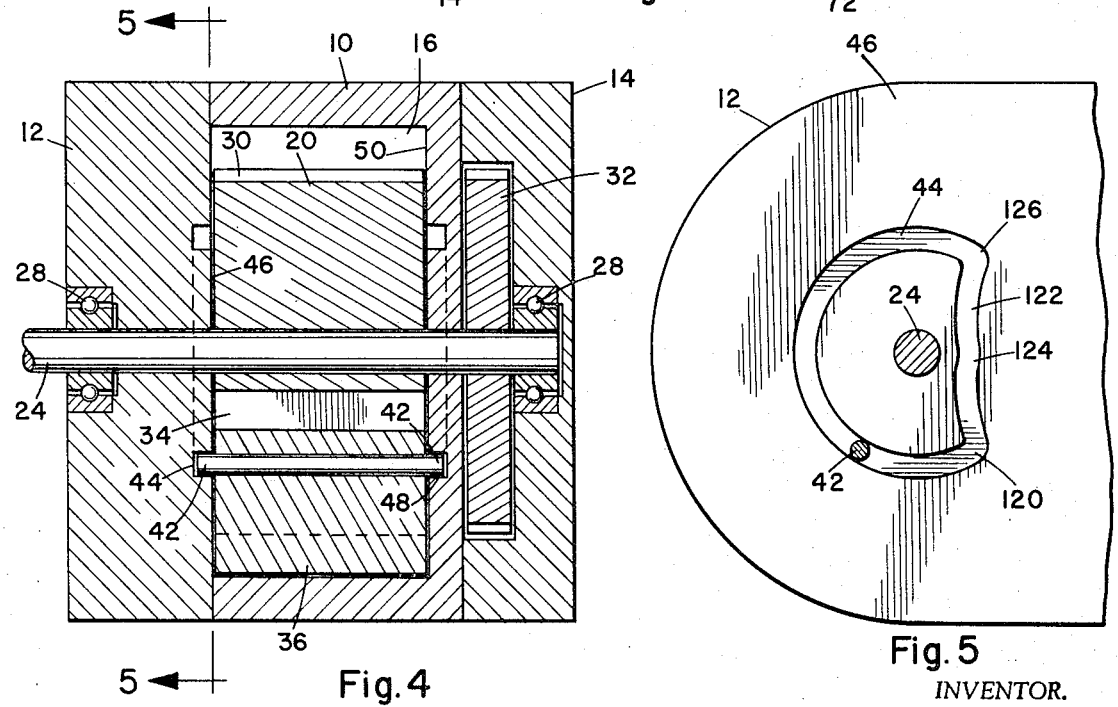
FIG. 4 is a sectional view taken on line 4—4 of FIG. 2.

By making the engine in sections it is a simple matter to stack multiple units axially for more power. Extension of the single unit engine into a dual unit is shown in broken line in FIG. 3. Gear box 14 is removed and a second valve body 12d and cylinder casing 10a are stacked on the first cylinder casing. The rotor shafts are extended through both units to the gear box 14a, now at the rear of the second cylinder casing. Cam disc 80 has an extension 80a with a second cam roller 82a to engage a second cam bar 84d. The valve actuating mechanism is the same as described above, with an extension rocker shaft 76a extending to the second rocker arm 74a. Cam roller 82a is offset from cam roller 80, preferably by 180 degrees.

so that the two units fire alternately. For purposes of illustration the cam roller 82a is shown at a position other than opposite roller 80.

It will be obvious that any reasonable number of units can be stacked, with common rotor shafts and concentric rocker shafts, and suitably spaced cam rollers for smooth running. The resultant engine is compact and, being composed of separable, standardized components, is simple and economical to manufacture and service.

Having described my invention, I now claim:

1. A rotary engine, comprising,
   a cylinder casing having a pair of circumferentially intersecting cylindrical chambers,
   a pair of generally cylindrical rotors each having an axial shaft and being rotatably mounted in said chambers, said rotors having circumferential teeth meshing at the intersection of the chambers and coupling the rotors in oppositely rotating synchronization,
   one end of said cylinder casing having an inlet port and an outlet port at the intersection of said chambers on opposite sides of and separated by the intermeshed portions of the rotors,
   each of said rotors having a substantially radially movable slide member,
   actuating cam means in said cylinder casing guiding said slide members in circumferential sliding contact with said chambers for the major portion of each revolution, and retracting the slide members through the intermeshed portion of rotor rotation,
   a pressurized source of combustible mixture connected to said inlet port,
   inlet valve means synchronized with said rotors to open and admit combustible mixture through said inlet port when said slide members are adjacent at opposite sides of the inlet port,
   and ignition means timed to operate when said inlet valve means closes.

2. A rotary engine according to claim 1, wherein said ignition means is actuated by said valve means at the end of the valve closing action.

3. A rotary engine according to claim 1, wherein said one end of the cylinder casing comprises a valve body secured to the casing, said valve means including a normally closed valve mounted in said valve body and controlling said inlet port,
   a rocker arm having a rocker shaft pivotally mounted on said valve body and coupled to said valve, and a timing cam on one of said shafts with actuating means coupled to said rocker arm.

4. A rotary engine according to claim 3, wherein said actuating means includes a cam bar secured to said rocker shaft, said cam bar having an adjustable portion movable relative to said timing cam to adjust the effective stroke thereof.

5. A rotary engine according to claim 4, wherein said timing cam comprises a disc having a cam roller rotatably mounted in the periphery thereof, said cam bar portion being movable substantially tangential to the path of said roller.

6. A rotary engine according to claim 3, wherein said ignition means includes normally open contact points mounted on said valve body and being engaged by said rocker arm to close when the rocker arm is holding said valve open.

7. A rotary engine according to claim 1, wherein said actuating cam means comprises recessed cam tracks in opposite ends of said cylinder casing, said slide members having axially projecting guide elements riding in the respective cam tracks.

8. A rotary engine according to claim 1, and including load carrying synchronizing gears secured to said shafts and interconnecting said rotors.

References Cited

UNITED STATES PATENTS

| | | | |
|---|---|---|---|
| 344,445 | 6/1886 | Harrold | 103—126(TO) |
| 888,196 | 5/1908 | Regenbogen et al. | 123—152 |
| 1,326,684 | 12/1919 | Newland | 123—12 |
| 1,387,166 | 8/1921 | Martinez | 123—152 |
| 1,547,030 | 7/1925 | Castillo | 123—146.5(A) |
| 1,865,666 | 7/1932 | Aruga | 123—16(X) |
| 1,923,500 | 8/1933 | Northey | 123—8(MC)(UX) |
| 2,215,106 | 9/1940 | Lefebvre | 123—146.5(A) |

FOREIGN PATENTS

| | | | |
|---|---|---|---|
| 4,266 | 3/1892 | Great Britain | 91—87 |
| 5,546 | 3/1912 | Great Britain | 123—12 |

ALLAN D. HERRMANN, Primary Examiner

U.S. Cl. X.R.

123—90, 146.5, 152; 418—206, 261